United States Patent [19]
Muncy et al.

[11] Patent Number: 4,963,208
[45] Date of Patent: Oct. 16, 1990

[54] SYSTEM FOR APPLYING DECORATIVE DEVICES TO GARMENTS AND THE LIKE

[76] Inventors: Charles W. Muncy, 9953 Lewis & Clark Blvd., St. Louis, Mo. 63136; Peter Stulberger, 2544 Cobblewood Dr., Northbrook, Ill. 60062

[21] Appl. No.: 123,856

[22] PCT Filed: Oct. 6, 1987

[86] PCT No.: PCT/US87/02580

§ 371 Date: Oct. 6, 1987

§ 102(e) Date: Oct. 6, 1987

[87] PCT Pub. No.: WO89/03315

PCT Pub. Date: Apr. 20, 1989

[51] Int. Cl.[5] ........................ B32B 31/20; B32B 3/02; B32B 15/02

[52] U.S. Cl. .................................... 156/145; 156/245; 156/323; 156/583.4; 156/583.8; 156/583.9; 428/156; 428/349

[58] Field of Search ............... 156/219, 220, 145, 323, 156/381, 245, 583.4, 583.91, 583.8, 583.9; 428/156, 157, 160, 349, 913.3; 206/457, 530, 532, 828

[56] References Cited

U.S. PATENT DOCUMENTS 3,738,898 6/1973 Lowe et al. ...................... 156/583.8
3,777,310 12/1973 Yang ...................................... 446/28
3,783,073 1/1974 Warnberg ........................... 156/323
3,996,088 12/1976 Crouch ........................... 156/220 X
4,032,687 6/1977 Hornsby, Jr. ........................... 428/1
4,201,810 5/1980 Higashiguchi ........................ 428/90
4,631,210 12/1986 McGee et al. ........................ 428/13
4,834,688 5/1989 Jones .................................... 446/28

*Primary Examiner*—Robert A. Dawson
*Assistant Examiner*—Mark A. Osele

[57] ABSTRACT

A system is provided for applying to fabric articles a liquid-containing decorative device constructed of interengaged thermoplastic sheets of predetermined configuration to develop a liquid-receiving pouch and a marginal portion with the latter having a normally exterior and a normally interior surface; which system includes a press having a fixed bed carrying a heating plate for receiving the article. Heating means for the heating plate are carried in the fixed bed. The press is provided with a swingably mounted pressure platen for movement between upper, inoperative position and lower, operative position; there being a pressure block having a normally downwardly opening recess configured complementarily to the pouch portion of the device for receiving the same and retaining it in desired relation upon the related article with the marginal portion of the decorative device being sandwiched between the pressure block and the article. The pressure block is disposed between the pressure platen and the fixed bed for pressure transmission as well as for retaining the decorative device marginal portion against the article. A bonding composition is coated on the normally interior surface of the decorative device marginal portion for fusion of the article and the decorative device during heat energization of the heating plate.

16 Claims, 2 Drawing Sheets

FIG. 7
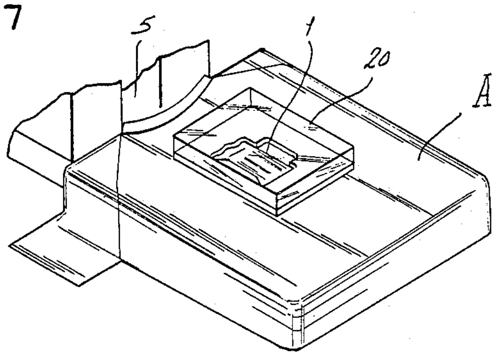
FIG. 8
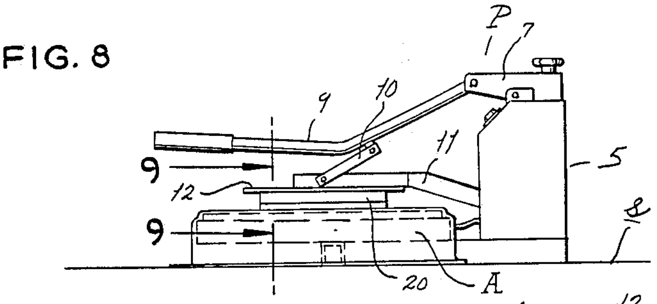
FIG. 9
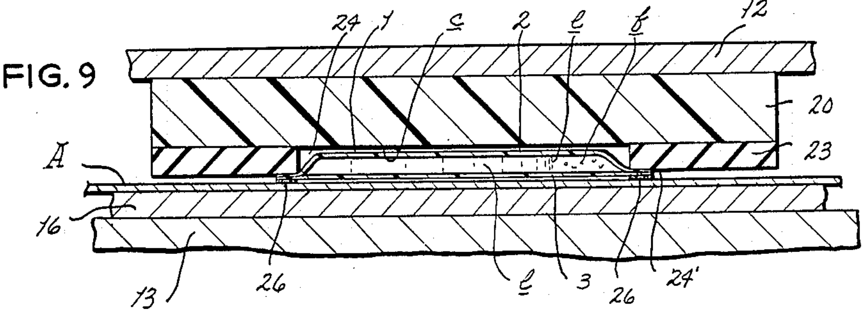
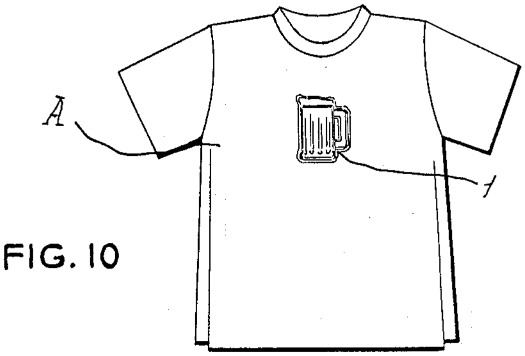
FIG. 10

SYSTEM FOR APPLYING DECORATIVE DEVICES TO GARMENTS AND THE LIKE

BACKGROUND OF THE INVENTION

1. Field of the Invention

This invention relates in general to fabric ornamentation and, more particularly, to a system for applying liquid-containing decorative devices to fabric articles, such as wearing apparel.

2. Description of the Prior Art

The provision of ornamental or decorative objects to wearing apparel, and like fabric articles has long been an expedient for enhancing the attractiveness thereof or for providing a symbol or the like for identifying a certain organization or groups to which the user is related.

For the most part, such decorative items have been customarily applied either by stitching; compatible fasteners; heat sealing, or silk screening, depending upon the nature of the item and the finished article. Such items have been fundamentally of two-dimensional character, although, on occasion, beads, jewelry and such may have been components of the same.

However, quite recently, there have been developed decorative devices of generally three-dimensional character which comprise a transparent pouch or receptacle for containing a predetermined quantity of a liquid, usually colored, which is thus visible. Devices of this type form the subject matter of U. S. Pat. No. 4,631,210 entitled "Liquid-Containing Decorative Device", which show that such devices may simulate, in a stylized manner, any desirable type of liquid vessel, such as, pitchers, beer mugs, bottles, etc., etc.; not to mention the host of other subjects or designs rendered amenable for liquid containment, such as geometric figures, hearts, etc. These devices provide a source of rapt fascination for the viewer.

The teachings of this aforesaid patent are hereby incorporated by reference in this application for rendering the disclosure hereof all the more comprehensive and explicit with respect to the nature of such devices.

Liquid-containing decorative devices of the type shown in the aforesaid patent have met with substantial commercial success to the end that means for safe, rapid, and highly economic production is required. Heretofore, the actual procedures for affixing such decorative objects to the associated garment as revealed by said patent have been relatively laborious, with attendant potential for costly damage to the object with resultant waste; or have required extremely costly equipment so that the economics of production have been markedly unfavorable. One such prior manner of securement has been by stitching, that is, through either hand stitching or by an embroidery machine for interconnecting the margins of the decorative devices to the garment or other fabric object, and the inability of such techniques to provide requisite volume should indeed be quite apparent as developed skills by the operators are necessary.

Another such method of securing procedure has involved the utilization of extremely costly machinery containing cylindrical dies which embody R. F. welders with expected relatively high temperature development for bringing about a heat sealing of the marginal portions of the devices to the fabric in question. In view of the melting point of the material of conconstruction of the devices, extreme vigilance must be exercised in the operation of such equipment.

The lack of utilization of conventional presses is obvious since the decorative objects could not withstand the pressure of the platens, nor the application of heat upon the normally exterior side of the device to be attached.

Therefore, in view of the ever-increasing demand for liquid-containing decorative devices efforts have been expended to attempt to develop systems, methods, or production techniques which, in addition to materially reducing the time of manufacture, will also provide for corresponding reductions in cost, as well as conduce to protection of the devices during application.

SUMMARY OF THE INVENTION

Accordingly, it is an object of the present invention to provide a system for securely affixing liquid-containing decorative devices upon garments or related soft goods, such as bedding, towels, and like fabric articles, in a manner rapidly accomplished with marked economy, and with appropriate protection of the devices.

It is another object of the present invention to provide a system of the character stated which is adapted for exercise by a single, relatively unskilled individual; and which eliminates any manually exercised techniques of application.

It is a still further object of the present invention to provide a system of the character stated which incorporates novel means for preventing damage or impairment to the liquid-containing decorative device to be applied so that inadvertent loss through production is inconsequential.

It is a still further object of the present invention to provide a system of the character stated which incorporates equipment which may be produced at a small fraction of the cost of the R.F. welders heretofore utilized so that the investment in production equipment is minimal.

It is another object of the present invention to provide a system of the character stated which is designed to bring about reliable securement of the decorative item to the garment or the like with relatively reduced energy, thereby further conducing to economic production.

It is a further object of the present invention to provide a system of the character stated which is useful with any preselected configuration or design of liquid-containing decorative objects for securing same to any suitable preselected compatible article; which, as indicated above, is markedly economic in practice so that high volume, low-cost manufacture is assured.

It is a still further object of the present invention to provide a unique bonding composition useful with the system to be disclosed which provides a singularly high degree of adhesive reliability whereby the longevity of the decorated object is achieved.

It is another object of the present invention to provide an improved press with associated accessory for causing securement of liquid-containing decorative devices to the particular, preselected articles in a facile manner.

BRIEF DESCRIPTION OF THE DRAWINGS

FIGS. 5, 6 and 7 illustrate sequential stages in the application of a liquid-containing decorative device pursuant to the system of the present invention.

FIG. 5 is a fragmentary, perspective view illustrating the bed of the press with a garment disposed thereon preliminary to receiving the decorative device.

FIG. 6 is a fragmentary perspective view of the press bed illustrating a garment disposed thereon and with a decorative device positioned on the same for application thereto.

FIG. 7 is a fragmentary perspective view of the bed of the press showing a garment disposed thereon, and with the pressure block provided upon the positioned decorative device.

FIG. 8 is a side view of the press illustrating same in operative condition

FIG. 9 is a vertical transverse sectional view taken on the line 9—9 of FIG. 8.

FIG. 10 is a front view of a garment in finished condition with the decorative device secured thereon.

DETAILED DESCRIPTION OF THE INVENTION

Figure 1:
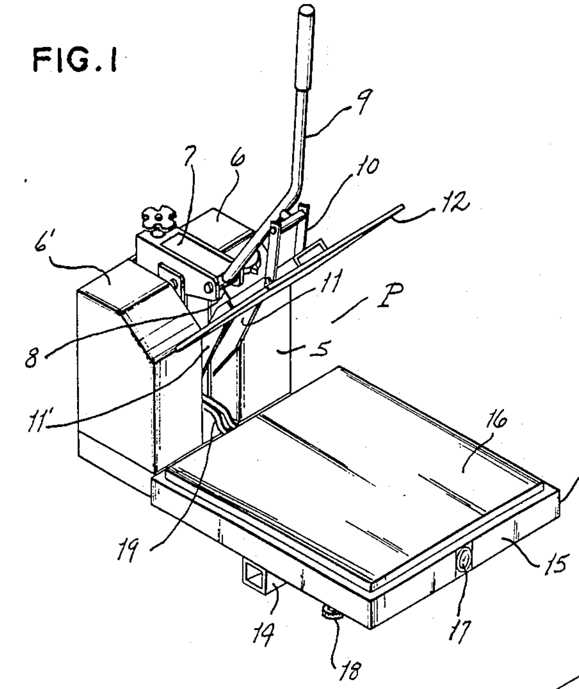
FIG. 1 is a perspective view of a press constructed in accordance with and embodying the present invention, being useful in the performance of the system of the present invention for applying liquid-containing decorative devices to garments and the like; illustrating same in inoperative condition.
Figure 3:
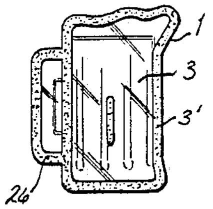
FIG. 3 is a rear view of the decorative device.
Figure 2:
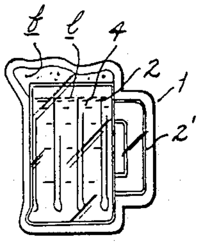
FIG. 2 is a front view of the exterior of a decorative device of the type to be applied in accordance with the system of the present invention.

Referring now by reference characters to the drawings, A designates a garment which, for illustration purposes only, constitutes a short-sleeve shirt, popularly referred to as a t-shirt, being fabricated of suitable fabric materials, whether synthetic fibers, natural fibers, or combinations thereof. Garment A is to be considered as merely an example of the type of article to which liquid-containing decorative devices, as indicated at 1, may be affixed pursuant to the present invention. It is to be recognized that bedspreads, towels, and like fabric, as well as articles of wearing apparel of all types, are to be considered as exemplified by garment A. Decorative device 1 is constructed in accordance with the teachings of U.S. Letters Pat. No. 4,631,210 which, as indicated above, is incorporated by reference herein.

It will be seen that device 1, for illustration only, is accorded the simulated configuration or stylized design of a beer mug, being formed of a pair of front and rear sheets 2,3, respectively, of flexible, transparent, fluid impervious character, such as, a suitable plastic, as polyvinyl, which sheets, respectively, contain registering marginal portions at 2′,3′, respectively, having been intimately mutually secured as by conventional heat sealing methods. Said sheets 2,3 coact to form a pouch or enclosed volume 4 for receiving a predetermined quantity of liquid, as at 1, and which, in this instance, may contain an ingredient which will promote a foam-appearing portion, as at f. Such liquid is desirably water-based, non-toxic, nonflamable, and adapted for ease of coloration. It is, of course, understood that the beer mug design is simply indicative of the myriad designs that decorative device 1 could assume. However, for purposes of disclosing the unique means of securing said decorative device to garment A, such design is quite adequate. The manner of supplying liquid to pouch or volume 4 does not constitute a part of the present invention, as all is set forth in Patent No. 4,631,210.

With reference being now made particularly to FIG. 1, P designates a press designed for effecting application of devices 1 to garments A which in conjunction with a novel accessory effects such application in a reliable manner, fully protective of device 1 so that the use of which substantially eliminates impairment or damage of such devices with conquent marked savings. Press P comprises a supporting assembly 5 which comprehends spaced-apart generally columnar members 6,6′ which mount therebetween a forwardly opening clevis member 7 at the outer end of which is pivotally mounted, as by a cross bar 8, a manually operable handle 9. Substantially centrally of handle 9, the same is swingably connected to a U-shaped linkage 10 for connection to mounting arms 11,11′ engaged in their outer end portions upon the normally upper face of a pressure plate or movable platen 12. Arms 11,11′ are suitably pivotally (not shown) engaged at their inner end portions to support assembly 5. By pulling forwardly and downwardly upon handle 9, pressure plate 12 will be swung downwardly into planar parallel attitude to the support surface as indicated generally at s (see FIG. 8). Disposed forwardly of support assembly 5, at the lower end thereof, is a stationary bed 13 which is maintained in limited elevated relation to the underlying support surface s, as, for example, by means of a cross brace 14 which may be constructed of tubular stock, preferably box-shape in cross-section, whereby suitable elevation is provided for dependency or draping of the side and end portions of the work, as garment A (see FIG. 5).

Stationary bed 13 incorporates a metal shroud 15 for receiving a heating plate 16 together with the associated components thereby providing a guard therefor. Shroud 15 is of general shallow, open-top, four-sided box character. Heating plate 16 is formed of a lightweight heat transferrable metal such as, particularly, aluminum, and having a thickness as within the range of 1 to 1¼″. Although not shown, heating plate 16 is disposed upon a heating element which may be provided in the under portion thereof. The heating element may be of any desirable well-known construction, such as high electric resistance wires in coil and/or sinuous pattern, or as of nichrome carried within or about a compatible insulating matrix, etc. for suitably dispersing heat throughout plate 16. Heating plate 16 constitutes the fixed or cooperating base platen of press P. A crucial aspect of the present invention is the provision of the heat source for press P being located in the stationary bed as opposed to being carried with the rockable pressure plate 12 as in current heat sealing equipment. A thermometer 17 is provided having its dial face conveniently located on shroud 15 and a knob 18 extends downwardly from the under surface of shroud 15 for suitable connection (not shown) to a rheostat (not shown) for controlling heating plate 16.

It is, of course, obvious that a conventional timing mechanism, an indicator light, an off-on switch, and a temperature light are suitably provided in accordance with usual practice for electrically operable equipment. The heating element (not shown) of heating plate 16 is connected by leads 19 to, preferably, a mercury controller (not shown) conveniently located within support assembly 5 for connection to an exteriorly located source of electricity.

Figure 4:
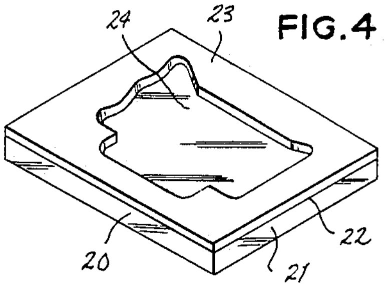
FIG. 4 is a perspective view of a pressure block in normally inverted position constructed in accordance with and embodying the present invention for use with the press illustrated in FIG. 1.
Figure 5:
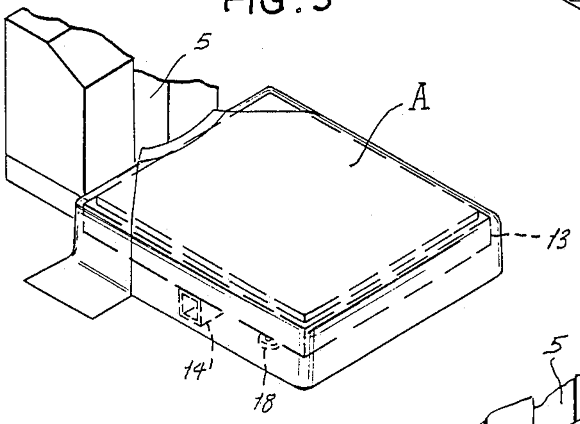
Figure 6:
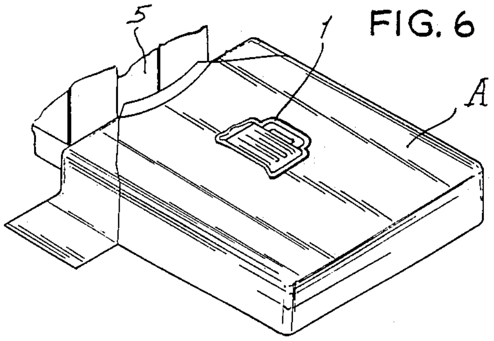

With reference to FIG. 5, it will be seen that bed 13 is of sufficient extent so as to provide a requisite surface for disposition thereon of the portion of garment A to receive a decorative device 1. Thus, garment A is laid upon bed 13 and sufficiently pulled or otherwise arranged so as to avoid wrinkling or the development of undesired folds to assure a smooth surface for disposition of device 1 in selected location thereon, as illustrated in FIG. 6. With device 1 so located, the user will then make resort to a pressure block 20. As may best be seen in FIG. 4, pressure block 20 comprises a preferably rectangular, block-like base 21 having a thickness of approximately one inch which is integrally constructed of strong, durable, material resistant to deformation through pressures applied thereon by operation of press P as well as through subjection to the operating temperature range thereof. Materials particularly suitable for base 21 are LEXAN* and PLEXIGLAS** which are entirely transparent. It is understood that base 21 could be made of any metal, such as aluminum, steel, etc., but such would sacrifice the appealing transparency. Secured upon the normally bottom face 22 of base 21 is a section 23 of resilient material, such as, preferably, silicone rubber, which is of like edge dimensions as base 21; such securement being effected by any appropriate compatible adhesive or bonding agent In its central portion, section 23 is cut-away to provide a through opening 24 having a contour corresponding to that of the particular decorative device 1. It is to be noted, with reference to FIG. 9, that opening 24 is of slightly reduced configuration with respect to decorative device 1 so that when the latter is received therein the marginal portions 2′,3′ will be disposed against edge 24′ of said opening with marginal portion 2′ being presented thereagainst. It will thus be seen that section 23 is of suitable thickness so that decorative device 1 may be received fittedly within opening 24, but with the marginal portions extending outwardly thereof as above stated. However, as may best be seen in FIG. 9, opening 24 is of a depth slightly greater than the maximum thickness of decorative device 1 so that when block 20 is in operative position, a limited clearance c will be provided.

*A trademark of General Electric Company for thermoplastic carbonate - linked polymers produced by reacting bisphenol.

**A trademark of Rohm and Haas Co. for thermoplastic poly(methyl methacrylate)-type polymers.

A bonding composition 26, to be described more fully hereinbelow, is provided throughout the decorative margin 3′ which will be in confronting relation to garment A when decorative device 1 is disposed thereon for affixation. Composition 26 is of marked suitability for causing decorative device 1 to be reliably secured to garment A within the heating range provided heating plate 16.

Before describing bonding composition 26, attention may be directed to the general operation of addressing and securing decorative device 1 to the receiving garment.

As pointed out above, with pressure plate 12 in upwardly raised position, as shown in FIG. 1, the garment A in question is disposed upon heating plate 16 in the appropriate attitude for acceptance of decorative device 1. Since, as discussed below, heating plate 16 will be in a heated state, garment A may be manipulated by handling the edge portions thereof so as to avoid any injurious contact. Then as shown in FIG. 6, device 1 is manually placed on the exposed face of garment A at the desired intended position. Thereupon the operator places pressure block 20 coveringly upon decorative device 1, whereby base 21 will be relatively above section 23, with opening 24 being directed downwardly or toward garment A and encasing decorative device 1. As is evident from FIG. 7, by reason of the transparency of pressure block base 21, the operator may observe that decorative device 1 is properly received within opening 24. As so disposed (see FIG. 9), bonding agent 26 being suitably coated upon marginal portion 3′ will thus be presented between decorative device 1 and garment A. Handle 9 is then pulled forwardly and downwardly to bring pressure plate 12 into flatwise, seated, covering disposition upon the now upper surface of pressure block 20 (see FIGS. 8 and 9). Continued downward force on handle 9 will cause requisite pressure to be brought to bear on block 20 with limited "give" or compression of section 23 so that said marginal portion 3′ of decorative device 1 is held tightly against garment A. Such state is continued for a predetermined period of time as in the order of 10 seconds and then handle 9 is returned upwardly causing pressure plate 12 to be withdrawn from disposition on pressure block 20, which is then lifted upwardly exposing the decorative device 1 as fully secured to garment A (see FIG. 10); the latter then being withdrawn from heating plate 16 to clear same for a succeeding garment.

It will be understood that the downward travel of handle 9 is restricted so that plate 12 will be caused to apply the requisite degree of pressure to maintain firm contact between marginal portion 3′ and decorative device 1 whereby mutual reliable adherence will be achieved. The resiliency of section 23 will assure appropriate transference of pressure to the marginal portions of decorative device 1 while avoiding any damage that might result if such section 23 were of inflexible material. Clearance c thus assures that decorative device 1 in its central or pouch-bearing portion will not be subjected to potentially damaging contact with the proximate face of base 21.

Bonding composition 26 is singularly designed to augment the reliability of securement of decorative device 1 through practice of the present invention. Fundamentally, composition 26 is basically of two-component character including an adhesive film and an adhesive enhancer. The latter is utilized to build up the thickness of the adhesive layer to assure a strong bond. As will be seen, the adhesive film will tend to evaporate and, thus, not provide the thickness desired so that resort must be made to the adhesive enhancer. It is to be recognized that decorative device 1 is preferably constituted of a vinyl plastic and, therefore, component 26 must be fully compatible therewith.

The adhesive film is constituted of a solution of vinyl chloride homo-polymers or vinyl chloride-vinyl acetate copolymers. Such resins are provided preferably in the solvent soluble grade as such have proved more satisfactory than when in the water emulsion grade. The solvents utilized comprise ketones, esters, or blends thereof, for providing the desired evaporation rate. Solvents of this type for such purpose are well known in the industry and are selected based upon whether a relatively fast evaporation rate is desired or a so-called "slow" one. Methyl-ethyl ketone and butyl acetate are examples of the myriad compounds for promoting so-called fast evaporation; while cyclo-hexanone and CELLOSOLVE acetate (ethylene glycol monoethyl ether acetate) are but examples of compounds promoting slow evaporation. Also, in view of the relative hardness of the resins involved, a plasticizer is utilized for general "softening" purposes. Dioctyl phthalate and organic phosphates such as 2-ethyl hexyl di-phenol phosphate are but exemplary of the numerous plasticizers well known in the art for promoting the requisite "flowability" of the resultant solution.

A general formulation for such solutions would be:

| | |
|---|---|
| Resin | Approx. 10% to approx. 30% By Weight |
| Plasticizer | Approx. 2-30% By Weight |
| Evaporating Agent | Approx. 40% to Approx. 88% By Weight |

With composition 26 it is desirable to utilize evaporating agents of the so-called "slow" type so that the following could be representative:

EXAMPLE I

| | |
|---|---|
| Vinyl Chloride | Approx. 30% By Weight |
| Dioctyl Phthalate | Approx. 20% By Weight |
| Cyclo-Hexanone | Approx. 50% By Weight |

The foregoing merely demonstrates the use of a single evaporation rate controlling agent, while the following demonstrates blends thereof;

| | |
|---|---|
| Vinyl Chloride | Approx. 30% By Weight |
| Dioctyl Phthalate | Approx. 20% By Weight |
| Cyclo-Hexanone | Approx. 25% By Weight |
| Ethylene Glycol Mono-ethyl Ether Acetate | Approx. 25% By Weight |

Another formulation for example purposes is as following:

| | |
|---|---|
| Vinyl Chloride-Vinyl Acetate Copolymers | Approx. 30% By Weight |
| 2-Ethyl Hexyl Di-Phenol Phosphate | Approx. 30% By Weight |
| Cyclo-Hexanone | Approx. 40% By Weight |

The foregoing, as stated, are simply illustrations of the constituents of the solutions to be formed. The number of agents available for evaporation or for plasticizing are myriad and are certainly within the knowledge of one having ordinary skill in the art, which latter hypothetical individual could very readily work out the proportionalities based upon the "softness" or flowability and the rate of evaporation. The present invention is directed, in this connection, to a bonding composition so comprised as to form an adhesive film with the properties discussed.

Thus, the amount of plasticizer is, of course, dictated by the degree of softness desired and with the solutions forming the adhesive film the same must be of such character so as to be suitable for movement through a silk screen. As pointed out above, since a relatively slow evaporation rate is desired, the cyclo-hexanone could be substituted by the CELLOSOLVE acetate or blends could be made of the same, such being only exemplary.

It should be understood that the foregoing is set forth for expository purposes and not for limitation since it is within the capacity of one having ordinary skill in the art to select solvents and plasticizers to provide a resultant solution having the desired physical properties.

The aforesaid adhesive film-producing solutions are prepared under ambient conditions. The same will be of a rather syrupy or viscous consistency and, thus, capable of being forced through the mesh of a silk screen, as by a conventional squeegee It is apparent that if such solutions were too "soft", that is, approximate a liquid, such as water or the like, with easy flowability, the same would not be practical since the resultant film would be too thin. In the practice of the present invention the aforesaid solution is silk screened upon decorative device margin 3, throughout the extent thereof, to form a wet deposit having a thickness in the range of 5 to 7 mils. Thus, by the viscosity of the solutions the same will readily retain disposition upon the marginal portions 3' and be resistant against flowing therefrom as would occur if the solutions were of thinner character.

There is then applied upon the wet adhesive film a layer of the adhesive enhancer which comprises a solid dry powder from the class comprising polyester and nylon or polyamide adhesive powders. As is well known in the art, there are a substantial number of powders of each resin so that it is a question of selecting the particular powder or suitable blends thereof to bring about a resultant having the desired melting point as well as the particle size. The polyamide powders may thus be formulated in accordance with what is well known as "Nylon 12" chemistry. As merely illustrative, a polyamide powder under the mark Gril-Tex of Emser Industries has the particular melting point range which is desired in the present application. As decorative device 1 is fabricated of vinyl it is apparent that the melting point of the adhesive enhancer powder should be below that of the vinyl so that manifestly a melting point within the range of approximately 180° up to 350° F. is requisite. The melting point should not be relatively low since such will bring about an inferior or poorer bond and, accordingly, the melting point of the powder should approximate, but be below, that of the vinyl. The other requisite physical factor is that of the particle size of the adhesive enhancer powder. Particles within the relatively fine range of 0–80 microns do not possess the adhesiveness desired, nor permit of the requisite buildup or thickness of the bonding composition 26. A blend of medium size particulate as in the range of 80 to 200 microns, and of the coarse size, 200–300 microns, is effected with the major constituent being of the coarser size. The proportionality can, of course, be easily adjusted, but it is to be recognized that the powder will be substantially of the coarse character and with the medium particles serving to fill the interstices between adjacent coarse particles.

The application of the powder upon the wet adhesive-producing film can be effected in any convenient manner, such as, either by sprinkling, dipping the decorative device into a container of powder, etc., so that a relatively thick layer will adhere to the wet film. Then the decorative device is subjected to atmospheric drying in any preselected manner, such as, by disposition upon a rack or other support adapted for retaining the decorative devices. Since a slow evaporation rate is designed to be achieved, the film will require the appropriate period to dry which may approximate up to one day. In drying, the film will evaporate from a thickness of from 5 to 7 mils to about 2 mils. Since an overall thick coating is desired, the adhesive enhancer will be applied to a depth of within resulting dry coating will have an overall thickness within the range of about 5 to about 7 mils. During the evaporation period, the film will tend to "bite" into the material of construction of marginal portion 3, of decorative device 1 to thereby assure of a firm anchorage of bonding composition and the enhancer powder will integrate with the adhesive film so that after the drying step has been completed, decorative devices 1 may be suitably stored, as in a stacked relation or the like, without danger of flaking or otherwise loss of any portions of the applied bonding composition 26.

Bonding composition 26 represents a substantial advance in this art, being one especially contrived for bringing about a long-lasting adherence between liquid-containing decorative device 1 and garment A so that the intended purpose of the latter will have expected longevity. It is obvious that heating plate 16 may have a coating of a suitable "no-stick" finish as comprised of tetrafluoroethylene fluorocarbon polymers or fluorinated ethylene-propylene resins, or a polyester film. The adhesive film of bonding composition 26 may be in carboxylated state, if desired, for increasing the adhesive nature thereof.

Although the operation of press P has been described generally hereinabove, the following will amplify such operation for the purpose of describing the operation in terms of the bonding composition 26.

Press P will be maintained in a continuous "hot" state, that is, at a temperature of approximately 350° F. or immediately therebelow. With garment A disposed upon heating plate 16 for receiving the decorative device 1, the same serves as an adequate insulator so that that level of heat which might affect a melting of the vinyl of decorative device 1 will not reach the latter. With decorative device 1 suitably disposed on garment A; with pressure block 20 being in operative position with respect to said device 1; and with pressure plate 12 being in lowered operative position, all as illustrated in FIG. 9, the same will remain in such state for a preselected interval as in the range of 10 seconds. This period of time is adequate for elevating the temperature of bonding composition 26 to cause same to effect a fusion between garment A and decorative device 1 so that the latter is fixedly mounted. At the end of such interval, handle 9 is raised with consequent lifting of heat plate 12 and lifting of block 20 so that the now ornamented garment A as shown in FIG. 10 may be withdrawn and a new blank garment A placed in operative position (FIG. 5), with the sequences above-described being then repeated. The thickness of the layer of bonding agent 26 together with the substantial coarseness of the adhesive enhancer is productive of a stable, reliable adhesion which may be brought about in a rapid fashion, permitting high volume production.

The simplicity of the system of the present invention should, from the foregoing, be quite self-evident as demonstrably such would not require the services of highly skilled personnel. Furthermore, press P may be produced at a fraction of the cost of a machine adapted for R.F. welding with the critical dies for accommodating the liquid decorative device.

What is claimed:

1. In a system for applying to fabric articles a decorative device preconstructed of precontoured interengaged thermoplastic sheets of predetermined configuration having a pouch portion and a marginal portion, said marginal portion having normally exterior and interior faces, a press having a fixed bed for disposition thereon of the article to receive the decorative device, a flat pressure platen, means for moving said pressure platen between upper, inoperative position and lowered or operative position, a pressure block adapted to receive the pouch of said decorative device for disposition thereover, said block being interposed between said fixed bed and said pressure plate, said pressure block comprises a rigid unyieldable base having opposed, normally outer and inner faces, and a layer of resilient material secured to the normally inner face of said base, said layer of resilient material being provided with an opening in corresponding configuration to that of the associated decorative device, said opening being of a depth slightly greater than that of the pouch of the associated decorative device, and means for providing heat to said fixed bed.

2. The invention defined in claim 1 wherein said opening is of such extent that the marginal portion of the associated decorative device will be presented exteriorly of said opening in confrontation to the edge adjacent portion of the layer of resilient material so that said marginal portion will be sandwiched betweeen said layer and the article to receive the decorative device, said decorative device being so received in said pressure block that the normally interior face of the marginal portion will be directed toward said article.

3. The invention defined in claim 1 wherein said fixed bed comprises a heating plate for disposition thereon of the articles to receive the decorative device, said means for providing heat to said heating plate being located beneath said plate.

4. The invention defined in claim 3 wherein said fixed bed comprises a shroud for receiving said heating means and said heating plate.

5. The invention defined in claim 2 wherein the rigid base of said pressure block is formed of pressure and temperature resistant transparent plastic material.

6. The invention defined in claim 5 wherein the layer of resilient material is formed of rubber.

7. The invention defined in claim 1 wherein the normally outer face of the base of said pressure block will be in planar parallel engaged relation with said pressure platen when the latter is in operative, lower position.

8. A method for applying to fabric articles a decorative device preconstructed of precontoured interengaged thermoplastic sheets of predetermined configuration having a pouch portion and a marginal portion having normally exterior and interior faces, providing a press having a fixed bed for disposition thereon of the article to receive the decorative device, providing a pressure platen, providing means for moving said pressure platen between upper, inoperative position and lowered or operative position, providing a pressure block receiving the pouch of said decorative device for disposition thereover, said block being interposed between said fixed bed and said pressure plate, the provided pressure block comprising a rigid unyieldable base having opposed, normally outer and inner faces, there being a layer of resilient material secured to the normally inner face of said base, the provided layer of resilient material being provided with an opening in corresponding configuration to that of the associated decorative device, and being of a depth slightly greater than that of the pouch of the associated decorative device, applying a heat activated bonding composition on the normally interior faces of the pouch marginal portions in confronting relationship and extending beyond the adjacent margin of the layer of resilient material for flatwise disposition upon the present portion of the article for pressure imposed position between pressure block and the fixed bed, there being provided also means for heating said fixed bed for activating the heat bonding composition provided on the normally interior faces of the marginal portion of the decorative device to be applied to effect fusing thereof.

9. The invention defined in claim 8 wherein said bonding composition will have a thickness within the range of about 5 to about 7 mils.

10. The invention defined in claim 9 wherein said bonding composition comprises an adhesive film and an adhesive enhancer carried on said film to provide a preselected resultant thickness.

11. The invention defined in claim 10 wherein said adhesive film is constituted of a solution from the class consisting of vinyl chloride homo-polymers and vinyl chloride-vinyl acetate copolymers.

12. The invention defined in claim 11 wherein said adhesive enhancer is a dry, solid powder, the particles of which have a coarseness within the range of about 80 to about 300 microns.

13. The invention defined in claim 12 wherein the adhesive enhancer particles are substantially in the range of 200 to 300 microns.

14. A decorative device for application upon articles of natural or synthetic fabrics or combinations thereof comprising front and back normally flat sheets of transparent, fluid impervious, plastic material disposed in flatwise registering relationship, means securing said front and back sheets one to the other in the marginal zones thereof for developing a pouch or volume therebetween, liquid provided within said pouch being of predetermined coloration for visual display through said front sheet, a bonding composition provided upon the marginal zone of the back sheet, said bonding composition comprising an adhesive film and an adhesive enhancer carried on said film having a thickness within the range of about 5 to about 7 mils, said adhesive film is constituted of a solution from the group consisting of vinyl chloride homo-polymers and vinyl chloride-vinyl acetate copolymers, said adhesive enhancer being a dry, solid powder, the particles of which have a coarseness within the range of about 80 to about 300 microns, said bonding composition being heat activatable for securing the decorative device upon the preselected article.

15. The invention defined in claim 14 wherein the adhesive enhancer comprises a co-polyamide.

16. The invention defined in claim 14 wherein the adhesive enhancer has a melting point within the range of approximately 180° up to 350° F.

* * * * *